US010652519B2

United States Patent
Katz et al.

(10) Patent No.: US 10,652,519 B2
(45) Date of Patent: May 12, 2020

(54) VIRTUAL INSERTIONS IN 3D VIDEO

(75) Inventors: Sheldon Katz, Ringoes, NJ (US); Gregory House, Doylestown, PA (US); Howard Kennedy, Hamilton Square, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 327 days.

(21) Appl. No.: 12/879,482

(22) Filed: Sep. 10, 2010

(65) Prior Publication Data

US 2011/0216167 A1 Sep. 8, 2011

Related U.S. Application Data

(60) Provisional application No. 61/241,687, filed on Sep. 11, 2009.

(51) Int. Cl.
*H04N 13/00* (2018.01)
*H04N 13/239* (2018.01)
(Continued)

(52) U.S. Cl.
CPC ......... *H04N 13/239* (2018.05); *H04N 13/122* (2018.05); *H04N 13/183* (2018.05); *H04N 13/246* (2018.05)

(58) Field of Classification Search
CPC ................ H04N 13/0239; H04N 13/0296
(Continued)

(56) References Cited

U.S. PATENT DOCUMENTS 7,257,237 B1 * 8/2007 Luck ................ A61B 5/1113
382/103
2003/0081813 A1 5/2003 Astle
(Continued)

FOREIGN PATENT DOCUMENTS

| CN | 1238889 | 12/1999 |
| CN | 101292255 | 10/2008 |
| WO | WO 9824243 | 6/1998 |

OTHER PUBLICATIONS

M. Kanbara, T. Okuma, H. Takemura and N. Yokoya: "A Stereoscopic Video See-through Augmented Reality System Based on Real-time Vision-based Registration," Proc. IEEE Virtual Reality 2000, pp. 255-262, 2000.*

(Continued)

*Primary Examiner* — Frank F Huang
(74) *Attorney, Agent, or Firm* — Fay Kaplun & Marcin, LLP

(57) ABSTRACT

Embodiments relate to insertions in 3D video. Virtual camera models enable insertions to be reconciled relative to left and right channels of the 3D video to maximize 3D accuracy and realism of the insertions. Cameras are formed as composites, and can be derived from other models. The camera models can be based on a visual analysis of the 3D video, and can be based on 3D camera data including toe-in and ocular spacing. The camera data may be derived from information collected using instrumentation connect to a 3D camera system, derived based on visual analysis of the 3D video, or derived using a combination of information collected using instrumentation and visual analysis of 3D video. Insertions can be made on-site or at a remote site, and camera data can be embedded in the 3D video and/or separately transmitted to a remote site. Insertions can be adjusted in 3D space based on a type of insertion, the 3D video scene composition, and/or user feedback, including interactive adjustment of 3D insertions and adjustments in view of user sensitivity to eye strain.

27 Claims, 7 Drawing Sheets

(51) Int. Cl.
*H04N 13/246* (2018.01)
*H04N 13/122* (2018.01)
*H04N 13/183* (2018.01)

(58) Field of Classification Search
USPC .......... 348/586, 589, 600, 691, 696, E7.002,
348/E7.026, E7.027, E7.029, E7.03,
348/E7.032, E9.031, E9.05, E13.023,
348/E13.065, E13.066, 757, 771;
342/187
See application file for complete search history.

(56) References Cited

U.S. PATENT DOCUMENTS

2008/0144924 A1* 6/2008 Hoffmann .................. 382/154
2010/0020068 A1* 1/2010 House ........................ 345/419

OTHER PUBLICATIONS

European Patent Office. PCT Notification of Transmittal of the International Search Report and the Written Opinion of the International Searching Authority, or the Declaration. International Application No. PCT/US2010/048427. Name of Applicant: Katz, Sheldon. Form PCT/ISA/220. dated Nov. 8, 2010. 3 pages.

European Patent Office. PCT International Search Report. International Application No. PCT/2010/048427. Name of Applicant: Katz, Sheldon. Form PCT/ISA/210. dated Nov. 8, 2010. 4 pages.

European Patent Office. PCT Written Opinion of the International Searching Authority. International Application No. PCT/US2010/048427. Name of Applicant: Katz, Sheldon. Form PCT/ISA/237. dated Nov. 8, 2010. 10 pages.

Kanbara, Masayuki et al. A Stereoscopic Video See-through Augmented Reality System Based on Real-time Vision-based Registration. Graduate School of Information Science. Nara Institute of Science and Technology. Electrotechnical Laboratory, MITI. 2000 IEEE. 8 pages.

Jinling, Zhang et al. Research on Fast and Accurate Occlusion Detection Technology of Augmented Reality System. The IEEE International Conference on Industrial Informatics (INDIN 2008). DCC. Daejeon, Korea. Jul. 13-16, 2008. 6 pages.

Ying Kin Yu et al. "Controlling Virtual Cameras Based on a Robust Model-Free Pose Acquisition Technique", IEEE Transactions on Multimedia, IEEE Service Center, Piscataway, NJ, US, vol. 11, No. 1, Jan. 1, 2009, pp. 184-190.

\* cited by examiner

VIRTUAL INSERTIONS IN 3D VIDEO

CROSS REFERENCE TO RELATED APPLICATIONS

This application claims the benefit of U.S. Provisional Appl. No. 61/241,687 filed on Sep. 11, 2009, entitled "VIRTUAL INSERTIONS IN 3D VIDEO," which is hereby incorporated by reference in its entirety.

BACKGROUND

Field of Invention

Embodiments relate to virtual insertions into 3D video.

Background Art

Methods for streaming video content to viewers may utilize stereoscopy to project program content into a 3D field. 3D capable systems may transmit separate channels for left and right eye images, providing parallax views of scenes. Although methods to add virtual insertions into conventional 2D video are known, such known 2D methods may not be adequate to provide optimum viewing experiences for viewers of 3D video. Accordingly, there is a need for providing realistic-looking virtual insertions in 3D video that appear to viewers as though the insertions were part of the original production.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. In the drawings.

The present embodiments will now be described with reference to the accompanying drawings. In the drawings, like reference numbers may indicate identical or functionally similar elements.

DETAILED DESCRIPTION

Figure 1:
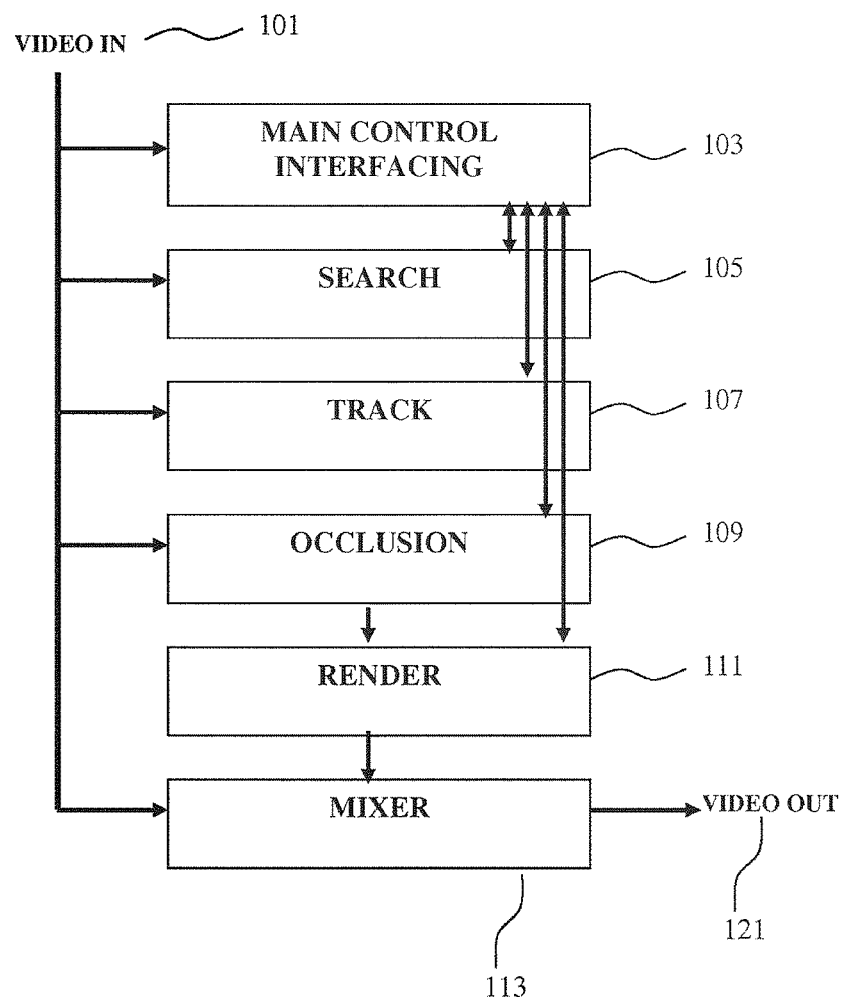
FIG. 1 is a schematic illustration of an embodiment for generating insertions and enhancements in 2D video.

While the present invention is described herein with reference to illustrative embodiments for particular applications, it should be understood that the invention is not limited thereto. Those skilled in the art with access to the teachings provided herein will recognize additional modifications, applications, and embodiments within the scope of the invention and additional fields in which the invention would be of significant utility.

Embodiments include inserting enhancements, such as advertising logos, score boxes, and the first down line in football games, into 3D video content. Embodiments relate to 3D media, including but not limited to: video, television (broadcast, cable, satellite, fiber), movie theaters, the Internet, mobile devices (cell phone or other wireless devices), and other platforms streaming 3D video media.

Insertions and enhancements into 2D video can be integrated with the video such that they can realistically appear to be part of the original video. Insertions can be implemented, for example, as described in U.S. Pat. No. 5,264,933 to Rosser et al., filed Jan. 28, 1992 and entitled "Television Displays Having Selected Inserted Indicia," the contents of which are hereby incorporated by reference in full. A virtual insertion system for 2D video may use any number of search techniques to recognize a scene and construct a virtual camera model for the scene for adding virtual insertions. A camera model can include a camera's position and other parameters, which can enable a camera to be located in reference to a scene. Once the scene is recognized, subsequent frame models may be calculated by any number of methods for tracking video scenes. Occlusion processing may enable foreground objects within the video to occlude insertions added to the scene background. Occlusion calculations may be performed based on scene color, for example, as in chroma keying systems. The insertion might be rendered using a commercially available graphics renderer, for example, before being mixed with the program video. Embodiments referenced herein may be utilized in match moving systems, where motion information is extracted from a scene and used to match a movement of an insertion to the movement of the scene.

The camera model may contain multiple parameters that relate to physical measurements of a tripod mounted camera such as pan, tilt, roll, image distance, x position, y position, z position. Other parameters, such as parameters for radial lens distortion for example, may be utilized. The camera data parameters may be derived from data collected using instrumentation connected to a 3D camera system, may be derived based on visual analysis of the 3D video, or may be derived using a combination of data collected using instrumentation connected to the 3D camera system and visual analysis of the 3D video. The camera model itself may contain part of all the information necessary to describe the field of view of one or both channels of 3D video. For example, it may contain a single parameter such as the zoom or image distance associated with the either the left or right channel. Alternate single channel parameters include, but are not limited to, focus, roll, lens distortion, etc. Camera data parameters determined for one channel view may be derived independent of the other channel view. Also, camera models may be limited to one or more parameters associated with both channels of 3D video (camera position, pan, tilt). Camera data parameters may be determined using similarities between the individual channel views. Furthermore, camera models may be limited to parameters that describe the relationship of the left and right channels (ocular spacing, toe angle, etc.). Camera data parameters may be determined using the differences between individual channel views. It should be understood that camera data parameters may be represented with wide range of units or means for measurement. A composite camera model for 3D video may be comprised of camera models for individual channels of the 3D video.

In an embodiment of this invention, a camera model may be represented as one or two 3×3 matrices. In another embodiment, the camera model may be generated using other dimensional matrices. The elements or parameters of the matrix representation may be considered camera data parameters. Matrix parameters may include camera external parameters, such as camera position coordinates, and internal parameters, such as sensor vertical and horizontal scale factors. Other methods, such as methods based on homography for example, may be utilized and the present invention is not meant to rely on a particular means to calculate a camera model. For example, the camera model may simply provide a homographic relation between the current camera channel views and some physical reference, such as the plane containing the basketball court. In another example, the camera model may include a homographic mapping between the input view and a reference image of the scene, wherein the reference image is used to define the location of a graphical insertion. The elements or parameters of the homographic mapping may be considered camera data parameters. In further embodiments of this invention, the camera models may be a representation of the location of an object, a group of objects, or a portion of the scene in the channels of the 3D video. As with all camera models, the object location in the field of view may be updated over time.

Embodiments based on adding virtual insertions to 2D video may be incorporated to generate separate insertions for left and right eye video channels, as might be used in 3D video systems. Such embodiments can address insertion errors that may occur in each left and right channel camera model. These model errors may occur due to noisy pixel data in search or track video channels, for example. Trackers using template blocks may have a random component, i.e., blocks may be selected randomly, and may not provide consistent behavior between channels in another example. When adding virtual insertions to 2D video, for example, a search model error may cause a virtual ad placed on a basketball court to be misplaced by 0.5 meters on the court. Viewers of the 2D video might not find this objectionable, especially if the logo position were relatively far from nearby prominent features such as intersecting court lines.

In 3D video, however, similar misplacement errors for left and right eye images may be deemed objectionable due to the left and right eye images being misplaced relative to each other, especially if the errors did not tend to track with each other. Accordingly, referencing left and right eye camera models to a common reference or maintaining a relative difference between left and right channel models, as described herein, may improve viewer experiences watching virtual insertions in 3D video.

FIG. 1 is a schematic illustration of an embodiment for generating insertions and enhancements in 2D video, such that they may realistically appear to viewers to be part of the original video. A source of video, such as a program video feed/video input, is input to the subsystem as video in 101. Video in 101 can be modified to include insertions and enhancements, and output as video out 121. A main controller 103 represents a hardware and/or software module that may control and coordinate subsystem blocks 103-113. Search block 105 represents a hardware and/or software module that may analyze video in 101 to calculate camera models and compute scene geometry for program video scenes. Track block 107 represents a hardware and/or software module that may track objects within the program video to reduce processing requirements for search block 105 and enable smoother tracking of insertions and enhancements associated with a background of video in 101. Occlusion block 109 represents a hardware and/or software module that may determine when foreground objects should occlude insertions and enhancements and generate an occlusion key to enable mixer 113 to display occluded insertions and enhancements. Render block 111 represents a hardware and/or software module that may receive camera models, insertion locations, occlusion keys, and other information to render insertions and enhancements for mixing with video out 121. Any type of real or virtual graphic that is combined or otherwise mixed with 3D video may be considered the insertion of an enhancement into the 3D video. This exemplary embodiment is for illustration only and embodiments can be implemented with various other architectures comprising hardware, software, or combinations of hardware and software for one or more blocks. Multiple render blocks 111 and mixers 113 may, for instance, serve as backend processors to provide multiple versions of insertions and enhancements to different viewers. In some embodiments, the Search block 105 and Track block 107 may be combined, for example. In other embodiments, the Search block 105, Track block 107, and Occlusion block 109 may be combined.

Basic approaches for generating camera models may include physical sensors connected to the camera system, computer vision or image processing analysis of the video channels, or a combination of physical sensor measurements and video analysis processing. The vision processing may be employed by the Search block 105, the Track block 107 or the Occlusion block 109 in FIG. 1. For the Search block 105, visual analysis may be used to derive image or screen locations of visual features in the scene. Camera models may be generated for particular frames through the association of image feature locations and their corresponding 3D scene positions. Such methods are described in U.S. patent application Ser. No. 12/659,628, the contents of which are hereby incorporated by reference in full. For the Track block 107, visual analysis may be used to track the location of features or points of interest between frames of a sequence of images. One example operation is described in U.S. Pat. No. 6,741,725 by Astle, the contents of which are hereby incorporated by reference in full. For the Occlusion block 109, the visual analysis may be used to distinguish foreground pixels of an image from background pixels. A method based on color is described by Jeffers et al in U.S. Pat. No. 7,015,978, the contents of which are hereby incorporated by reference in full.

Figure 2:
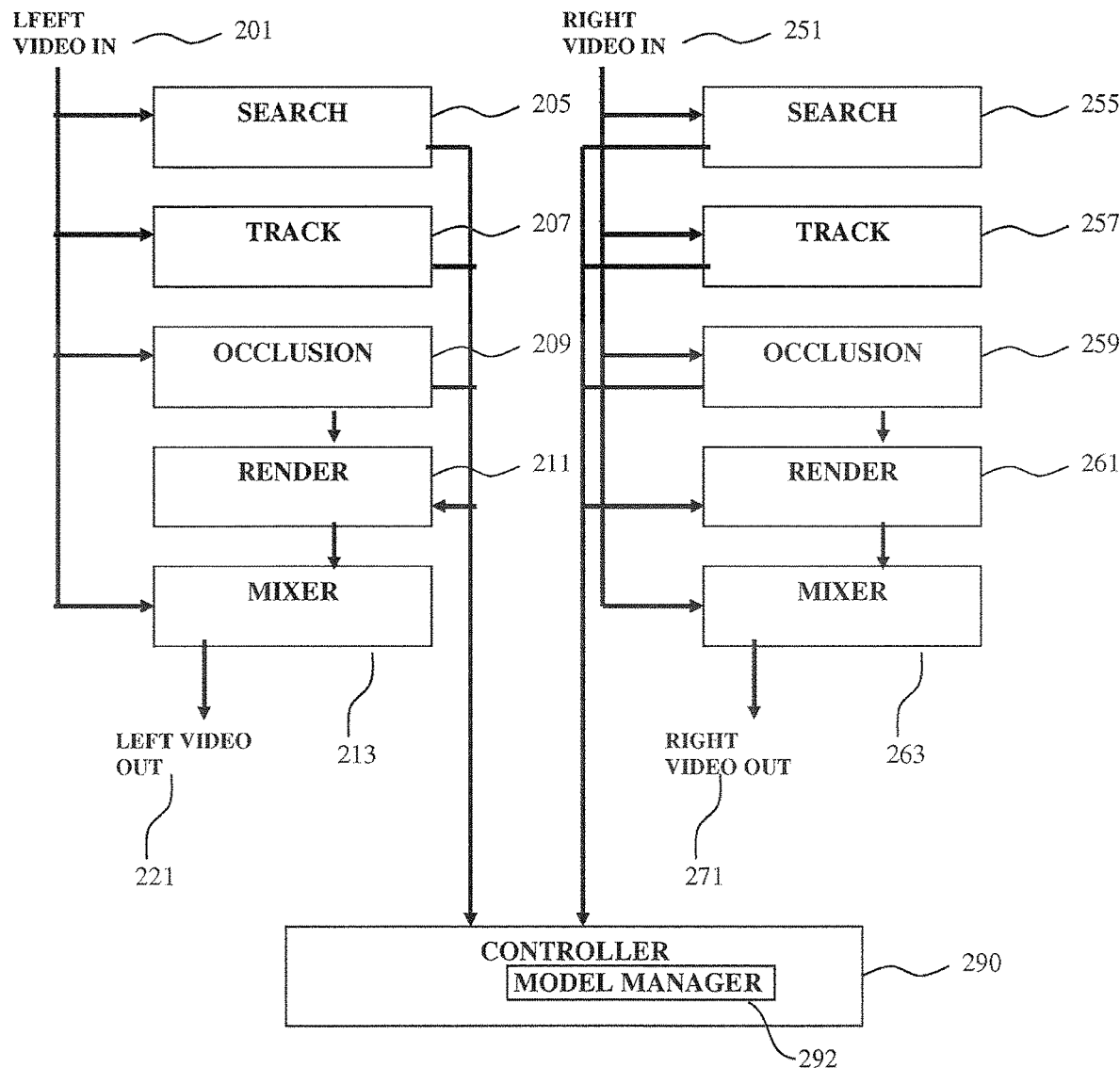
FIG. 2 is a schematic illustration of an embodiment for generating insertions and enhancements in 3D video.

FIG. 2 shows a schematic layout of an exemplary embodiment for generating insertions and enhancements in 3D video. Controller 290 can employ methods used to add virtual insertions into 2D video. Controller 290 represents a hardware and/or software module that may interface with video processing units for both left and right channels. Program video for the left eye video channel is input, as left video in 201, to corresponding subsystems search 205, track 207, occlusion 209, and mixer 213. Program video for the right eye video channel is input, as right video in 251, to corresponding subsystems search 255, track 257, occlusion 259, and mixer 263. Left/right video in 201, 251 may be modified to include insertions and enhancements, and output as left video out 221 and right video out 271, respectively.

Controller 290 may control and coordinate the various subsystem blocks. Search blocks 205, 255 represent hardware and/or software modules that may analyze left/right video in 201, 251, and calculate camera models for program video scenes. Track blocks 207, 257 represent hardware and/or software modules that may track objects within the video to reduce processing requirements for search blocks 205, 255, and enable smoother tracking of insertions and enhancements with respect to backgrounds of left/right video in 201, 251. Occlusion blocks 209, 259 represent hardware and/or software modules that may determine when foreground objects should occlude insertions and enhancements so as to generate an occlusion key that may enable mixers 213, 263 to display occluded insertions and enhancements. Render blocks 211, 261 represent hardware and/or software modules that may receive camera and other models, insertion locations, occlusion keys, and other information to render insertions and enhancements for mixing with left/right video out 221, 271.

Controller 290 may include a model manager 292 which monitors search blocks 205, 255 and track blocks 207, 257 to determine current camera model information for left and right video channels. The model manager 292 may reference each camera model for the left and right video channels to reconcile the left and right camera models. For example, the model manager 292 can calculate an average/reference camera model having a camera position, in 3D world coordinates, midway between the left and right channel camera models. In some cases, using either the left or right channel camera models as a common reference may be preferable. Using an average or common reference camera model associated with both left and right video channels may reduce the effects of camera model mismatches between left and right channels. Left and right channel camera models may, for example, be offset by fixed amounts or distances to the common reference camera model. As an example, the left and right channel camera models may be made to have fixed spatial distances in 3D world coordinates from the common reference camera model's 3D world coordinates. The distance between the left and right camera models may, for instance, correspond to the distance between the left and right camera lenses for a known 3D camera system. The distance between camera lenses, or ocular distance or spacing, may vary during video sequences, but an average distance may be adequate for some applications. For other applications, it may be desirable to more accurately model ocular spacing with known formulas or approximations, for example. In another example, offsets from the common reference camera model may be calculated using methods for calculating parallax between stereo images. This may be accomplished through visual analysis of the left and right channels alone, or visual analysis of the left and right channels in combination. Parallax or stereo analysis may be used to determine or derive the relationship between channels of 3D video. Camera data parameters may be derived based on parallax or stereo analysis of the 3D video channels. Reconciliation between channels may be used for a subset of parameters as well. For example, zoom or magnification data might be reconciled based on an average zoom value before the left and right camera models are reconciled. In this example, zoom data could be filtered for noise before applying it to calculate camera models. Alternately, a minimum squared error fit might be employed to find a best match to the input parameters.

Limiting physical parameters to valid expected ranges is another mechanism that may be employed in the reconciliation process. This may apply to individual points in time as well as over a period of time. For example, the rate of change of a particular parameter, such as zoom, may be bounded and smoothed. This may be achieved in part through image processing of the 3D video channels or signal processing of physical sensor measurements. Reconciliation may utilize known filtering techniques, statistical methods, thresholding methods, or other approaches. Reconciliation may be applied to individual camera data parameters or a grouping of camera data parameters. A grouping of camera data parameters, such as a composite camera model, may be made consistent with or otherwise reconciled with one or more camera data parameters. In some embodiments, a composite camera model and one or more individual camera data parameters are made consistent with or otherwise reconciled with initial estimates for the one or more individual camera data parameters. Reconciliation may involve making a camera model or camera data parameters consistent with other camera data parameters. In one embodiment, one or more camera data parameters or camera models that are reconciled with a first camera data parameter may be generated simultaneously to the first camera data parameter. In another embodiment, one or more camera data parameters or camera models that are reconciled with a first camera data parameter are generated sequentially after the first camera data parameter. In alternate embodiments, one or more camera data parameters or camera models that are reconciled with a first and second camera data parameters, are generated either simultaneously with or sequentially after the generation of the first and second camera data parameters. Reconciliation may be based on the channels of the 3D video, visual analysis of the 3D channels, camera parameters derived from the 3D video channels, sensor measurements or camera parameters of the 3D camera system, or any combinations of the above. Reconciliation is not limited to a particular method or group of methods.

For some 3D applications, it may be desirable to utilize more frequent search models in comparison to 2D applications, to minimize drifts which can occur with scene tracking. It also may be desirable to minimize relative drifts of left and right channels with respect to each other. Search accuracy for 3D insertion applications is desirable in view of potential errors associated with 3D objects converging to incorrect locations within 3D scenes, for example. Such errors may make inaccurate insertions appear noticeably unnatural in 3D, in contrast to location errors in 2D images. For example, a convergence error for a 3D first down line in a 3D football game telecast may make the line appear either over or under the playing field. Left and right channel insertions of the first down line need to match in length as well as have correct positions, or line ends may appear unnatural in 3D. Additional types of errors, e.g. sudden errors, may cause objects to suddenly move in 3D space. Size mismatches may cause color errors or other appearance problems. In such cases, the model manager 292 can improve performance by taking into account camera model differences between left and right channels.

Track blocks 207, 257 may utilize 2D methods for scene tracking, such as texture template methods. (See, e.g., U.S. Pat. No. 6,741,725 to Astle, entitled "Motion Tracking Using Image-Texture Templates.") Using visual analysis of the channels of 3D video, texture templates or tracking blocks may be selected within scenes for scene tracking and generating models. Tracking methods may use 2D information in scenes, using 2D texture templates from left and right channels. Other tracking methods may use 2D scene texture but utilize 3D position information for the tracking blocks. Such methods may be referred to as 3D tracking methods, even though they utilize 2D texture templates. In other cases, 3D information derived from stereo views of left and right channels may be used. 3D tracking blocks based on voxels, or 3D pixels, may be used for 3D scene tracking. Such methods may be extended to other techniques such as optical flow. For many applications, 2D processing may be adequate, however, and minimize complexity and cost. In some embodiments, an object or groups of objects or a portion of the scene may be tracked in the individual channels of the 3D video, or tracked jointly across both channels simultaneously.

Using voxels, some 2D tracking method errors may be avoided. For example, 2D template tracking may fail when too many template blocks, relative to background blocks, are on moving foreground objects in scenes. When such foreground objects move in relation to a background, incorrect camera models may be calculated. This might occur, for example, during a basketball game telecast when a camera zooms in on players, and tracking uses blocks on players. Using voxels with known 3D coordinates can enable selecting background voxels based on 3D position for tracking. In the above example, voxels might be selected on a court floor plane or viewer stands plane, for example. Similar to search, tracking may benefit by model manager 292 taking into account model differences between channels. Performance gains may also be realized by limiting 2D block or voxel searches within constraints defined by known left and right channel relationships. Searching for blocks or voxels over smaller regions may enable use of more tracking elements, giving better track accuracy and performance. The above analysis may be achieved through visual analysis of the 3D channels, sensor measurements of the 3D camera system, or a combination of visual analysis and sensor measurements. The uses of voxels may be part of a reconciliation of the visual analysis or sensor measurements associated with the channels of the 3D video.

Occlusion blocks 209, 259 can perform occlusion processing. Occlusion processing may, for example, be done using methods such as chroma keying. For 3D video, occlusion processing could use 3D information from the scene. Pixels within a scene may, for instance, be referenced in both left and right video channels using methods such as template matching. 3D position information for corresponding left and right channel pixels may then be calculated using, for example, epipolar geometry techniques. Once 3D position information for pixels is determined, an occlusion subsystem may determine whether or not those pixels should be occluded by foreground objects. As an example, if a foreground block of pixels were determined to be located closer to the 3D camera than a background block of pixels in the scene, the foreground block of pixels could be made to occlude the background block of pixels.

Figure 3A:
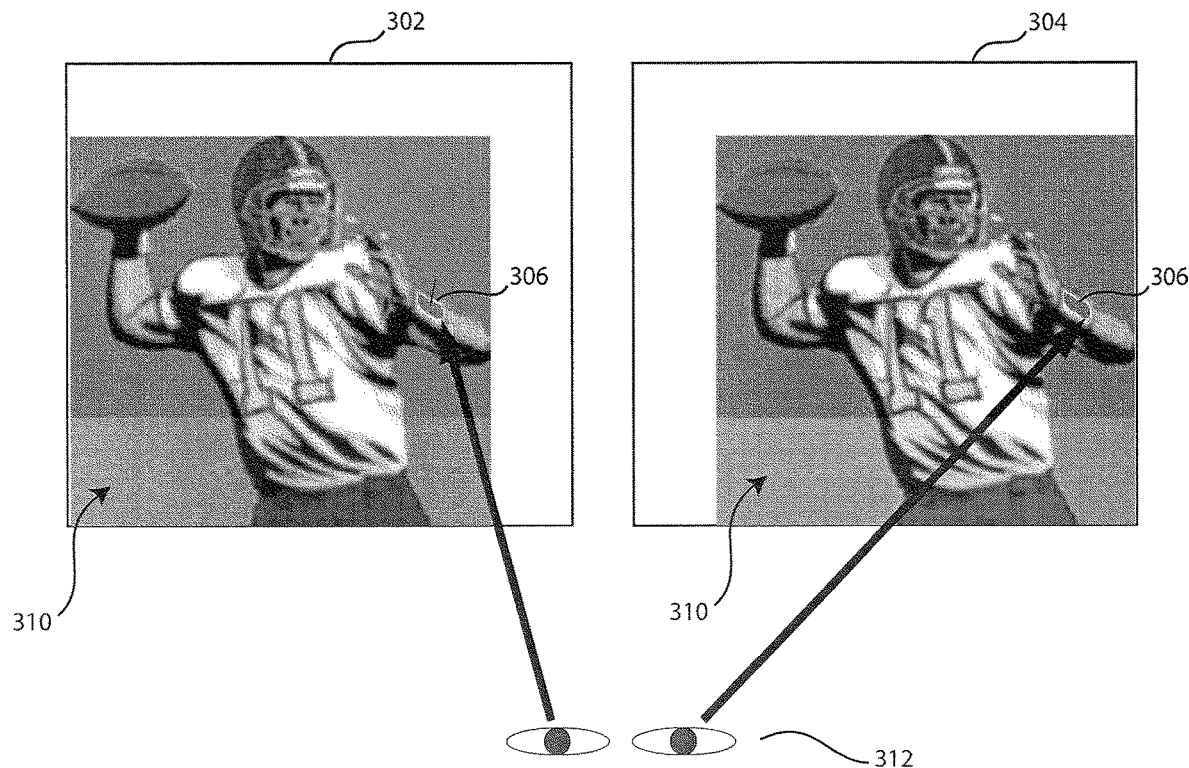
FIG. 3A illustrates a first view of an exemplary 3D occlusion method according to an embodiment.

FIG. 3A illustrates a first view of an exemplary 3D occlusion method according to an embodiment. A patch of green color on a player's wrist band is shown as patch 306 in a left eye channel 302 and in a right eye channel 304. Using a chroma key method in each of the left/right eye channels 302, 304, this patch 306 may be difficult to distinguish from the green color of background playing field 310 and may increase a likelihood of bleeding. However, embodiments can use a parallax method to distinguish patch 306 from background 310, even when similar colors such as the patch 306 and background 310 are involved. Parallax methods can also be used in conjunction with chroma key methods.

Figure 3B:
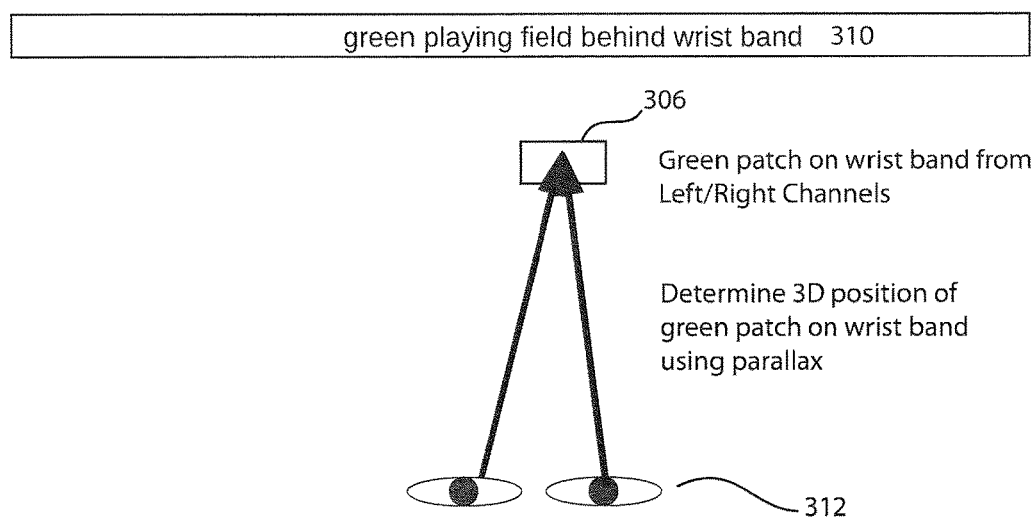
FIG. 3B illustrates a second view of the exemplary 3D occlusion method of FIG. 3A.

FIG. 3B illustrates a second view of the exemplary 3D occlusion method of FIG. 3A. Using parallax, the 3D position of wrist band green patch 306 may be determined to be closer to the camera/viewer 312 than the similar green color of playing field 310. A virtual insertion, such as a yellow first down line placed behind the player on playing field 310, can therefore be occluded by patch 306 based on the parallax determination. Insertions and enhancements utilizing parallax can avoid unnatural "bleeding" of the first down line insert over the patch 306.

Figure 4A:
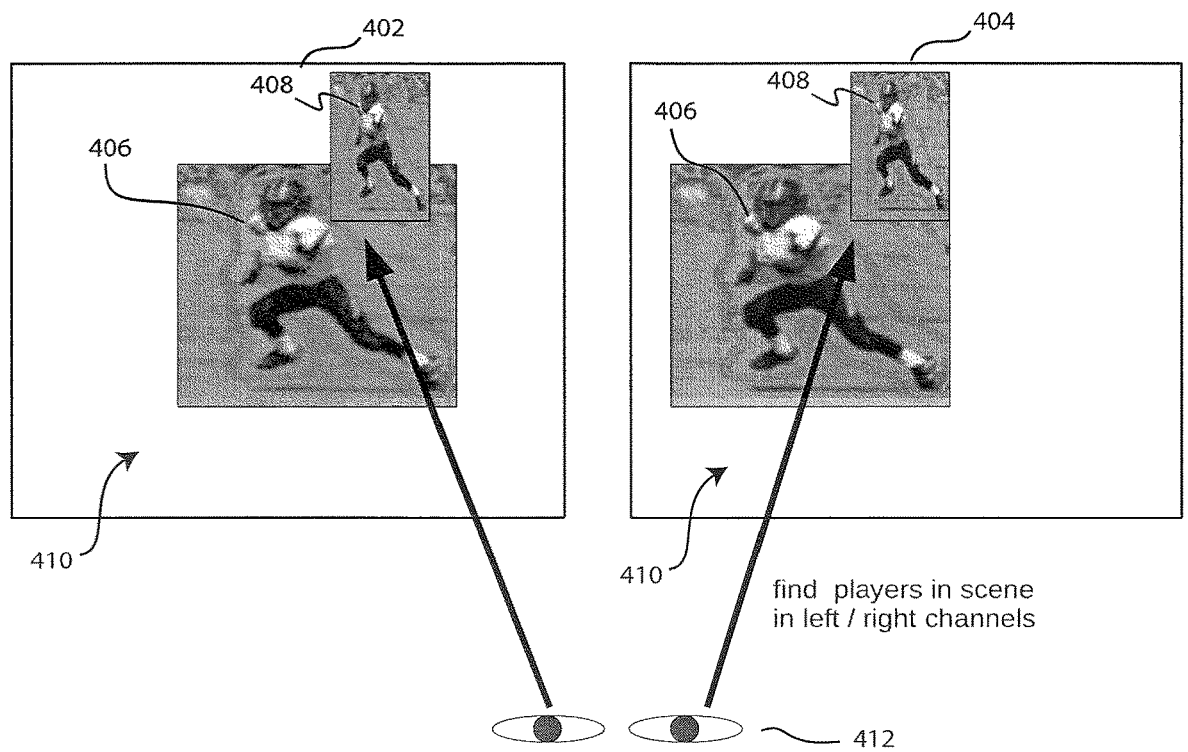
FIG. 4A illustrates a first view of an exemplary 3D occlusion method according to an embodiment.
Figure 4B:
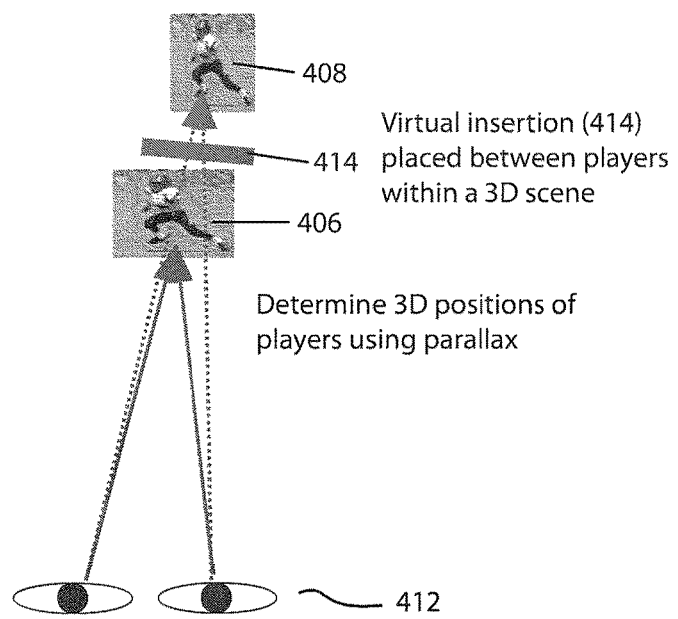
FIG. 4B illustrates a second view of the exemplary 3D occlusion method of FIG. 4A.

FIG. 4A illustrates a first view of an exemplary 3D occlusion method according to an embodiment, where spatial information is used for multiple players 406, 408. Using a search, for example, players 406, 408 are found in left and right channels 402, 404. Positions of the players 406, 408, including a distance from the camera/viewer 412, may be determined using parallax. Playing field 410 may appear in the background and can be occluded by other players and virtual insertions. As illustrated in FIG. 4B, virtual insertion 414 may be occluded by player 406 who is closer to the camera/viewer 412, but not by player 408 who is farther from the camera/viewer 412. Virtual insertion 414 may appear to be between players 406 and 408 within the 3D scene, while not bleeding into the playing field background 410 behind players 406, 408. This method may be extended to any plurality of players or objects within 3D scenes.

The stereo visual analysis between the left and right views of the 3D video may allow the generation of a depth map or mask, where pixels or regions of the video scene may be represented by depth measurements. Various methods for generating depth maps from a stereo view can be used. When the depth map accurately follows the outline of objects within the scene, it may be used to generate an occlusion mask to key out sections of inserted graphics. Keyed out sections are prevented from occluding foreground objects, and enable foreground objects to appear in front of the inserted graphic. This may, for instance, be derived from the depth map by making a pixel by pixel comparison between an effective distance from the camera of a pixel of the inserted graphic and the distance from the camera of the point in the scene associated with the pixel. The inserted graphic may, for instance, be keyed out when the object or scene pixel is closer to the camera than the virtual position of the graphic. The inserted graphic may, for instance, be keyed into the video when the object or scene pixel is farther away from the camera than the virtual position of the graphic.

Standard graphics that overlay the video in 2D sports broadcasts may present additional challenges in 3D video productions. Graphics may include fixed score graphical overlays, sometimes referred to as score bugs or Fox boxes, which may continuously display the current game clock, score, and relevant play information. Graphics may also include temporary pop-up graphics, sometimes referred to as lower-third graphics, that provide background information about players in games. An approach for inserting such graphics in 3D video may be to make the graphics appear at fixed locations or distances relative to the camera. However, this may not be pleasing to viewers and, in some cases, may cause eye strain sometimes associated with 3D viewing. Whether graphics appear pleasing to viewers may depend on the depths of objects and the background in the 3D video scene at a given time or over a period of time. Positioning objects and the background at greater viewing distances may be easier for viewers to focus on, and therefore reduce viewer eye strain. Additionally, graphics placed relatively close to the camera and/or far away from scene elements, e.g., far in front of the display plane/screen and/or near to the viewers, may distract viewers from the scene and/or appear to viewers as irrelevant to the scene. Integrating the graphics within the scene, however, can minimize such problems.

Embodiments may use camera models to guide the placement of virtual graphics, including burn-in graphics, in 3D video scenes such that they may appear more pleasing to viewers. Camera models, along with physical models, may allow the depth range of objects in scenes to be determined. In one embodiment, the burn-in graphics may be placed at the location of the viewing screen/display plane, appearing to be located at the same distance from the viewer as the viewing screen/display plane. In other embodiments, burn-in graphics may be placed at comparable distances relative to objects in view, or slightly in front of or behind objects in view. Graphics placements might differ based on the composition of a scene. For example, placement of a graphic in a high camera with a wide surveillance shot of a football game can differ from placement of a graphic for a field level, zoomed-in shot of a group of players on the field. In another embodiment, burn-in graphics may be placed at a depth beyond the objects or playing surface in scenes, appearing at a relatively large distances from the camera. Camera models and search methods may be used to determine screen locations that would likely be un-occluded by players or referees, or algorithms may find un-occluded areas directly. In further embodiments, graphics depth may be fixed for a given camera based on expected operational coverage, such as surveillance view versus isolated player coverage. This may be ascertained in a systematic manner using tally signals or listening to the audio call of the game by the director of the production, for example. In another embodiment, camera models may be used to evaluate scene suitability for graphics overlays taking into account 3D distance from the camera. Graphics may be selectively enabled using various criteria so as to be pleasing to viewers.

Embodiments may be extended to other information that may be inserted into 3D video scenes. Subtitles or closed captioning text may be inserted and integrated within 3D scenes. Insertions may be positioned to minimize eye strain or for other functional or aesthetic reasons. Dialog text may be placed near speakers in scenes, for example. Metadata within video streams may enable automatic placement of closed caption text within scenes, for example. Virtual insertion placement may be controlled by viewers, and can be implemented, for example, as described in U.S. Patent Application Publication No. 2010/0050082 to Katz et al., filed Aug. 13, 2009 and entitled "Interactive Video Insertions, and Applications Thereof," the contents of which are hereby incorporated by reference in full. Viewers prone to or sensitive to eye strain when watching 3D video may choose to favor insertions at longer viewing distances, for example.

Embodiments may utilize virtual graphics integrated in scenes to present various types of data in 3D video, such that the data appears pleasing to viewers. Information about the game status may be presented as an alphanumeric graphic integrated onto the field of play, for example. In one embodiment, such data may be presented in a fixed field location, such as next to the pitchers mound in a baseball game, or as part of the center circle or near the end line in a soccer game. In another embodiment, an informational graphic may be attached to other virtual graphics, such as the down and/or distance graphics, which are associated with the placement of the first down line or line of scrimmage graphics. The informational graphics may be presented in alternate locations of the television production. This may include the back wall or in the stands of a baseball game, or a sign hanging from the upper deck of a stadium structure in a football game production.

Placing virtual insertions at greater viewing distances may reduce eye strain and may reduce eye focusing requirements following periods of relatively close focusing. For some viewers who are sensitive to 3D video and who may develop headaches, focusing at greater distances may reduce unpleasant symptoms. Having the ability to control virtual insertion distances may enable video productions to reduce eye strain and other symptoms associated with 3D video.

Parameters for a 3D video camera system include ocular spacing and toe angle. Ocular spacing is the distance between lenses, and toe angle is the relative viewing angle between lenses. The parameters may be controlled manually by an operator. This may be done by a designated individual to support one or more 3D camera operators. Motors may move cameras to adjust the parameters. The parameters may be determined based on object distance and other scene information. Operators may determine the parameters by relying on experience with similar scenes, using known guidelines, using live view screens, or using other techniques. Cameras or camera controllers may calculate these parameters based on look up tables or parameters such as viewing distance, viewing angle, scene geometry, etc. to determine camera settings. Ocular spacing and toe angle may be computed directly by visually matching and registering feature points in the background between the two stereo channels. Known camera ocular spacing and toe angle may be incorporated into calculations for 3D insertion models. These parameters may be embedded within video as metadata or may be sent via a data channel directly to a virtual insertion system, for example.

In an embodiment using camera data associated with settings/parameters from 3D cameras, a controller may embed the 3D camera data into the vertical blanking interval of the video recording produced by the camera. The 3D camera data can include ocular spacing, toe angle, zoom, focus, extender, and other 3D camera parameters or signals. Additional data from a 3D camera mount, such as pan and tilt data similar to the data from systems used for 2D video, also may be included in the 3D camera data. Such embedded 3D camera data may be routed with the video to remote locations, such as broadcast studios, for 3D virtual insertions. Insertion regions in video, or insertion methods, may be selected to ensure data integrity at the final destination for a virtual insertions system. In another example, camera data might be encoded within unused audio channels within the horizontal blanking region or horizontal ancillary data (HANC) region of the video.

Other types of meta data, other than camera data, may be inserted in video to enable virtual 3D insertions at downstream stages in a video production and/or distribution pipe-line. In one example, 4 points may define a target area for virtual insertions for each of the left and right channels. These 8 points define a 3D rectangular plane that can be used for insertions at a later stage. Other number of points or alternate representation such as edges or curves or splines may be used for designating the location of inserted enhancements. In another example, a 3D target place holder may be inserted in the video and then replaced downstream. The target place holder may represent the image coordinates for inserting an enhancement in a particular frame or key frame. The target place holder for intermediate frames may be interpolated or otherwise determined from the target place holder in key frames within temporal proximity to the intermediate frame. Alternately, the target place holder may represent image coordinates of a physical object in the scene, such as a football field, used for determining image coordinates of an enhancement or insertion. The coordinates may be embedded or otherwise encoded into the 3D video such that it does not affect the portion of the video used for active viewing. This may include unused audio channels within the horizontal blanking region or horizontal ancillary data (HANC) region of the video. The place holder may be processed so that occluded regions are not included in the place holder. In other examples, insertion locations may be encoded in metadata and occlusion key masks that are separately encoded. Various similar methods may be devised by those skilled in the art.

In some cases it may be preferable to process video upstream, e.g. near the event location, as opposed to downstream, e.g. at a studio. As an example, video available at an event may be uncompressed while video in a studio may be compressed to facilitate satellite transmission. It may be that occlusion processing provides better results using uncompressed video, for example. In another example, it may be desirable to maintain a smaller equipment footprint in a studio by offloading at least some processing to stages upstream from the studio.

For some applications it may be desirable to use a combination of camera data and vision processing to calculate insertion/camera models, or use vision processing alone for calculating models and deriving camera system/scene parameters. In one example, pan and tilt data might be used to provide an approximate search location to a vision based system which could refine the search using vision based methods. In another example, an approximate search location could be derived by vision processing and ocular spacing and toe angle utilized from the 3D camera. Various combinations may be advantageous to different applications and signal availability. Vision based processing may be achieved through visual analysis of the video channels of 3D video. The channels may be processed independently or in combination.

Camera models for individual channels or the channels themselves may be used individually or jointly to calculate ocular spacing or toe angle parameters for 3D camera systems. Calculated parameters may be used to control 3D cameras or to augment manual camera operator control. These settings may be refined when video changes in response to new settings and new camera models/parameters are calculated. Limits may be placed on parameters such as zoom to avoid framing which may not be pleasing to viewers. Calculating ocular spacing and toe angle automatically may enable quicker setup of 3D cameras and provide more consistent setups and results. Automatic parameter calculation may save production costs by minimizing labor. 3D productions may favor relatively close views of scenes to give viewers a stronger sense of 3D structure. Relatively long views, in which objects are at relatively large viewing distances, may appear more like 2D video to viewers and it may be deemed that 3D productions are not needed for such views. Framing action shots at closer distances, such as during football telecasts for example, may provide challenges for quickly setting up or readying 3D cameras. For such cases, embodiments may be used to automatically adjust 3D camera parameters for varying scene shots. Using these methods, a long football pass might be covered with tighter varying shots of a long pass, as opposed to a more consistently zoomed out shot, for example.

In another embodiment for virtual insertions, it may be desirable to place insertions on a particular plane, such as a virtual 3D first down line in a 3D football game telecast for example. The left and right channel inserts need to be positioned correctly within frames so that the final insert will converge to the correct 3D position within the scene. Position errors may cause the first down line to appear either over or under the plane of the field, for example. To avoid such problems, left and right channel insert positions may be monitored and adjusted to ensure the final 3D insert converges on a particular plane in the scene. In some cases it may be acceptable or preferable to en towards one side of a plane, such as above a playing field as opposed to below the field, for example.

Figure 5:
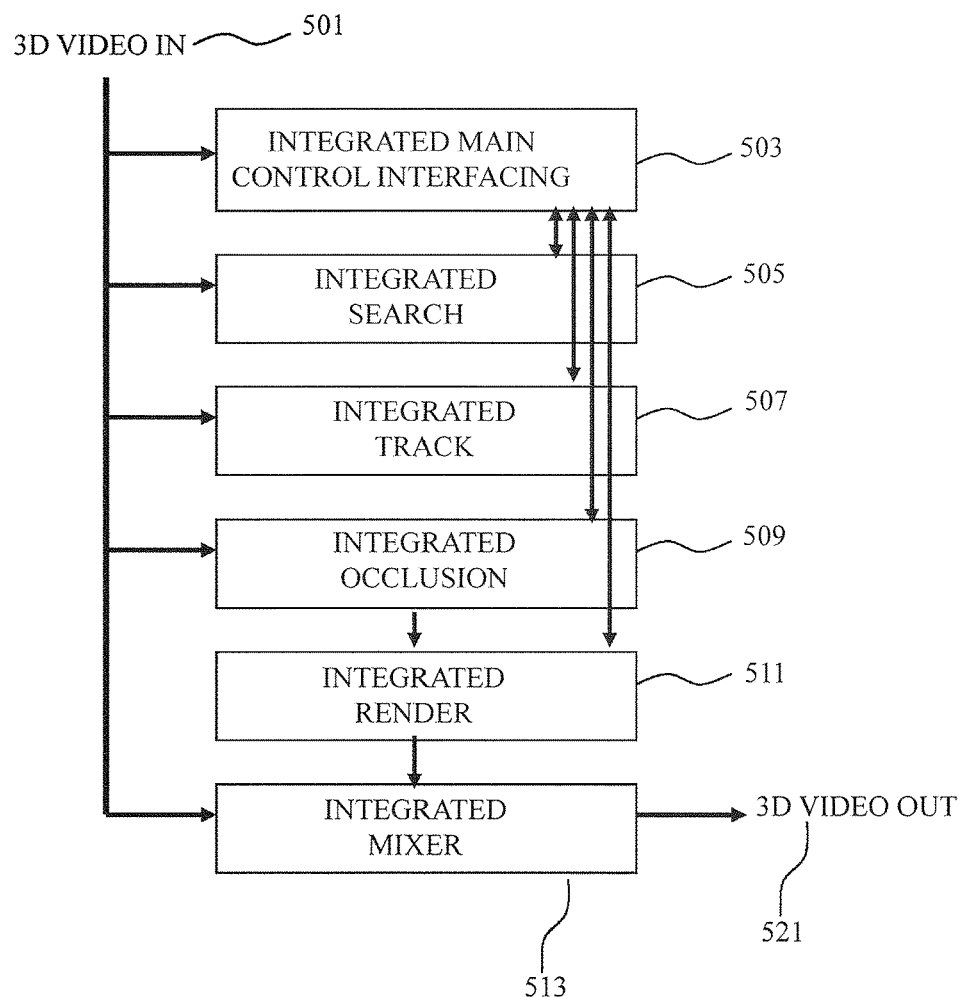
FIG. 5 is a schematic illustration of an embodiment for generating insertions and enhancements in 3D video.

FIG. 5 is a schematic illustration of an embodiment for generating insertions and enhancements in 3D video, demonstrating that 3D video can be handled using an integrated approach. The input, 3D video in 501, may comprise separated left and right channels such as independent High Definition Serial Digital Interface (HD-SDI) feeds, or may comprise a composite feed having left and right channels interlaced. Interlacing can include anamorphically squeezing left and right channels into a single HD-SDI stream, or using an alternate scheme for combining the feeds. The 3D video in 501 may be modified to include insertions and/or enhancements, and output as 3D video out 521. The insertions and/or enhancements can appear to viewers to realistically be part of the original video. A main controller (integrated main control interfacing 503) may control and coordinate subsystem blocks 503-513. Other schemes of combining or encoding individual channels into a composite stream are possible, and may be based on video compression methods.

Integrated search block 505 may analyze the input 3D video in 501 and calculate camera models and analyze scene geometry for program video scenes. The camera models and analysis may be derived from a single channel and extrapolated to the second channel, derived from a single channel and refined by processing the second channel, computed from both channels with a model that optimally matches both views, or any combination/permutation of the above. For integrated search block 505, visual analysis may be used to derive image location of visual features in the left and right channels. A composited camera model may be generated for a particular frame through the association of image locations of scene features in 3D video channels and corresponding 3D position of scene features. A composited camera model may be generated by reconciling feature locations derived for individual channels. This may be achieved by, for example, computing a minimum squared error fit for mapping between image locations of features and 3D scene locations.

Integrated track block 507 may update models based on a single view and extrapolate to the second view. Integrated track block 507 may update models based on a single view refined by the second view, update models directly to optimally match both views, or update models based on any combination/permutation of the above. Visual analysis may be used by the integrated track block 507 to track the location of features or points of interest between frames of a sequence of images. This may be performed in combination with physical sensor measurements. Integrated track block 507 may generate a composite model in a similar manner to model manager 292 of controller 290 (FIG. 2), or may track an object or part of an object such as the helmet of a hockey player. In one embodiment, the object may be tracked and the scene may be tracked independently, such that the object position relative to the scene may be derived for a graphical effect such as putting a trail behind the object, e.g., a player. Furthermore, integrated track block 507 may use data extracted by instrumenting the camera head (pan, tilt, ocular spacing, toe angle, etc.), and extracted lens information (zoom, focus, doubler, fstop, optical axis toe-in, etc.), by communicating or making electrical connections to the camera and/or lenses. In one embodiment, a pre-shoot calibration process is used to derive the relationship between left and right camera views. In another embodiment, left and right eye channel models are derived based on knowledge of the physical camera, e.g. based on knowledge of left and right eye channel camera sensors, lens parameters, etc. At run-time, the camera model may be computed for one channel and the calibration model may be used to derive the camera model for the other channel.

Integrated occlusion block 509 may determine when foreground objects should occlude insertions and enhancements in 3D video by generating a mask key associated with each channel. For chromakey methodology, one or both channels may be used to determine the optimum color of the insert region, and this may be used to generate independent keys for both channels. Correspondence between background pixels in both channels may be used to smooth shot noise or other occlusion artifacts in mask keys for a particular camera channel. Alternately, the occlusion masks for both channels may be directly computed from stereo depth maps. Masks for both channels may be processed to ensure that the same corresponding pixels for each channel are selected for masking. Having some pixels masked in one channel and not masked in the other channel may result in artifacts such as insertion color errors or other artifacts caused by improper left and right channel matching. Visual analysis may be employed by the integrated occlusion block 509 to generate the mask key for each channel.

Integrated render block 511 may perform stereo rendering of insertions based on a composite model determined from individual left and right channel models. Graphics rendering engines may be used to generate simultaneous left and right channels for virtual insertions integrated in 3D video. Key mixing of occlusion masks with graphics keys may be implemented by integrated render block 511 and also possibly final mixing of 3D video with 3D fill channels. Also, mixing may be implemented using an independent integrated mixer block 513, which may be comprised of two broadcast video mixers. In some embodiments, mixing may be implemented by a single broadcast mixer, if the left and right channels are interlaced in a standard video format such as HD-SDI.

In one embodiment, integrated render block 511 may render visual elements according to camera models determined by integrated search block 505 and integrated track block 507. In an example, the visual element may be a three-dimensional object, and integrated render block 511 may render the three-dimensional object to appear within the video. In that example, integrated render block 511 may render three dimensional dynamic/animated figures using three-dimensional modeling techniques, including, for example, texture loading, virtual camera modeling and rendering to a view port. Alternately, the rendered 3D object may be static, such as a 3D representation of the first down line. Three dimensional rendering techniques can be used such as those in gaming applications. In other examples, the visual element inserted into 3D video in 501 may be an image, video, graphic, text, or advertisement (such as an advertising logo). Visual elements may be generated using character fonts, allowing insertions to be derived from data sources such as channels broadcasting game data or player position statistics during sporting events. Virtual elements that are combined or otherwise mixed with 3D video may be considered to be the insertion of an enhancement into the 3D video.

Visual elements inserted into the 3D video in 501 may track with background scenes, such as a virtual first down line insertion locked to a football playing surface background. A visual element may track a point of interest, such as rings positioned at players' feet during a sporting event. Part of a graphic may track a point of interest within the video, such as an arrow pointing to a player in a sporting event where only the point of the arrow tracks the point of interest location. 3D graphic insertion may be relative to both background scenes and foreground points of interest, for example, when graphics marks the trail (path) of a moving player in a broadcast video. In this case, trail points—feet position through time—are first initialized based on point of interest tracking and then updated to compensate for camera motion.

In one embodiment, 3D telestration graphics, that diagram the movements of players, for example, are overlaid in 3D on the playing surface. In another embodiment, telestration graphics may be represented as a burn-in at a set distance from the camera. This might work well for some applications but might be limited in others which could benefit from scene spatial information. As an example, a telestrator operator might place circles around players based on distance from the camera or display plane. For some players, such circles might appear to surround the players, but for other players the circles might appear to float above them. Placing such circles based on 3D position within the scene, such as near players' feet for example, may provide improved perspective relationships between players and circles. Similar issues can apply to other graphics, including arrows pointing to players. For example, arrows placed a set distance behind a display plane may not appear closely or obviously linked to players. In a specific embodiment, the telestration graphics in the 3D video may be positioned and/or generated in part based on user commands captured using a manual interface (touch screen, mouse, gaming device, tablet, etc.). Telestrator graphics may be made to track with 3D scenes, such as arrows following players, for example. Telestrator scene tracking may be enabled using the methods described herein including using camera ocular spacing and toe angle data, for example. In an illustrative example, circles could be inserted around players' waists. Using 2D methods, placing circles in scenes near players' feet could result in circles not being associated with players. Accurately placing circles in 3D space could fix this. Telestration graphics that are combined or otherwise mixed with 3D video may be considered to be the insertion of an enhancement into the 3D video.

Figure 6:
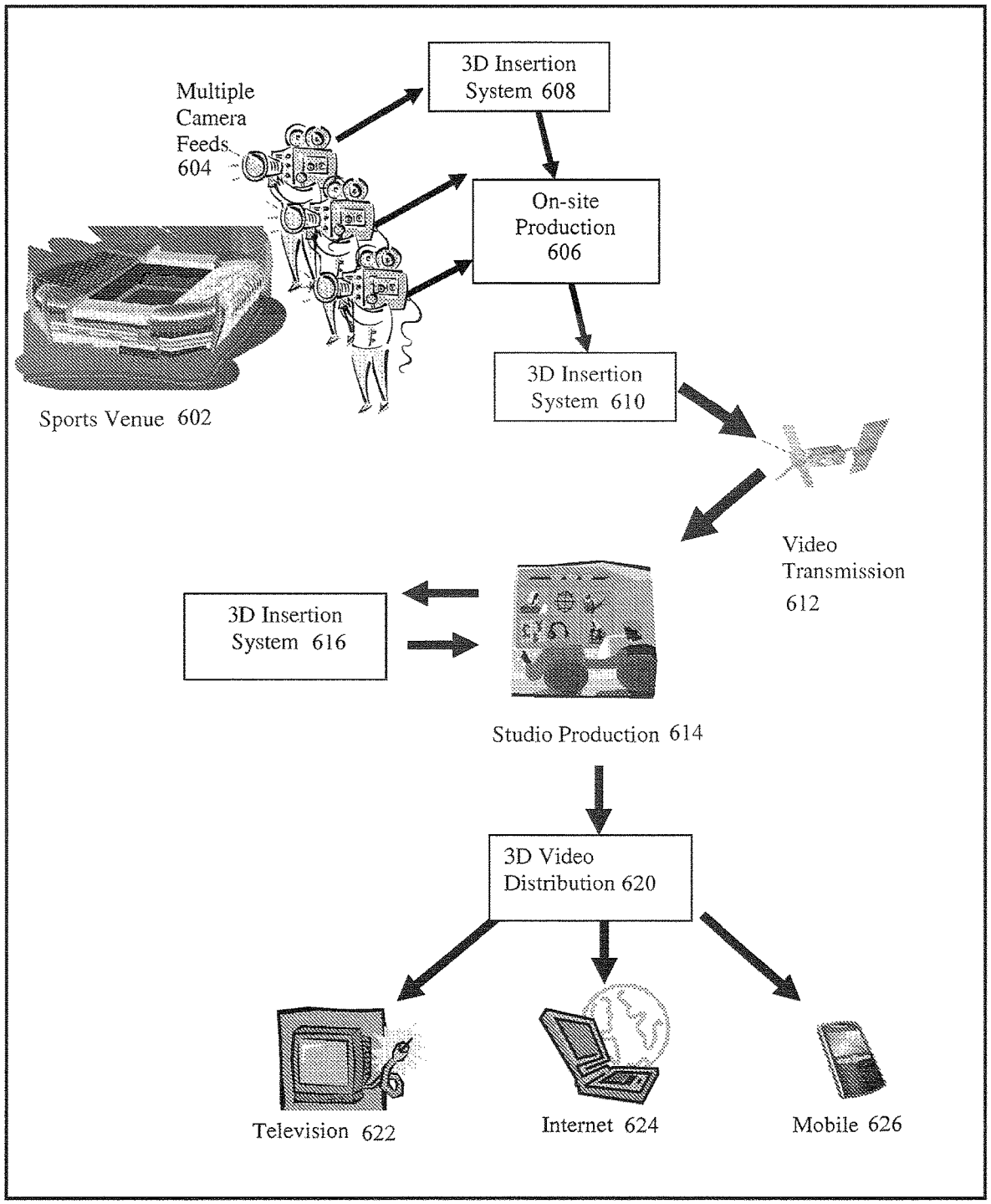
FIG. 6 illustrates an exemplary 3D Video production and distribution pipe-line according to an embodiment.

FIG. 6 illustrates an exemplary 3D Video production and distribution pipe-line according to an embodiment. Virtual insertions/enhancements in 3D video using camera and other data information may be provided at different stages of the 3D video pipe-line, as illustrated in FIG. 6. The contest at a sports venue 602 may be covered by multiple 3D video cameras 604, and the 3D video feeds sent to an on-site production 606. The 3D virtual insertion system may modify a dedicated 3D video camera feed at 3D insertion system 608 upstream from a left/right channel switcher(s) of on-site production 606, for example. The system can modify the on-site 3D video program feed at 3D insertion system 610 downstream from the on-site production 606.

The camera data information may be extracted by instrumenting the 3D camera or 3D camera system, which may include the lenses, controller and tripod head. Camera data information may be provided to 3D insertion systems through a data connection or by encoding information in the video format. Camera model information may be extracted directly by analyzing the video, or a combination of video analysis and camera sensors. The 3D video feed may be transmitted by video transmission 612 to a remote location such as a broadcast studio production 614, where virtual insertions may be integrated in the 3D video using a 3D insertion system 616. Camera models or data parameters may be transmitted from an on-site production stage to a remote location, where data is received and utilized to integrate an enhancement into the 3D video. The 3D video with virtual insertions may be distributed through a 3D video distribution 620, where it may be provided to platforms including television 622, the Internet 624, or mobile 626.

In an embodiment, virtual insertions are integrated in 3D video at a location remote from an on-site production, using video analysis of one or both channels of the broadcast video. The location may include but is not limited to a broadcast studio, regional cable head-end, local cable head-end, cable node, set-top box, computer system and mobile device. In another embodiment, the video analysis may happen on-site or in a remote location, such as, but not limited to, a studio or a regional cable head-end. The information may be propagated downstream in the distribution chain to where the insertion is integrated (regional cable head-end, local cable head-end, cable node, set-top box). In yet another embodiment, camera sensor information may be derived for the 3D video camera(s) and sent to a location remote from the venue to be used by a virtual insertion system to integrate graphics into 3D video.

Figure 7:
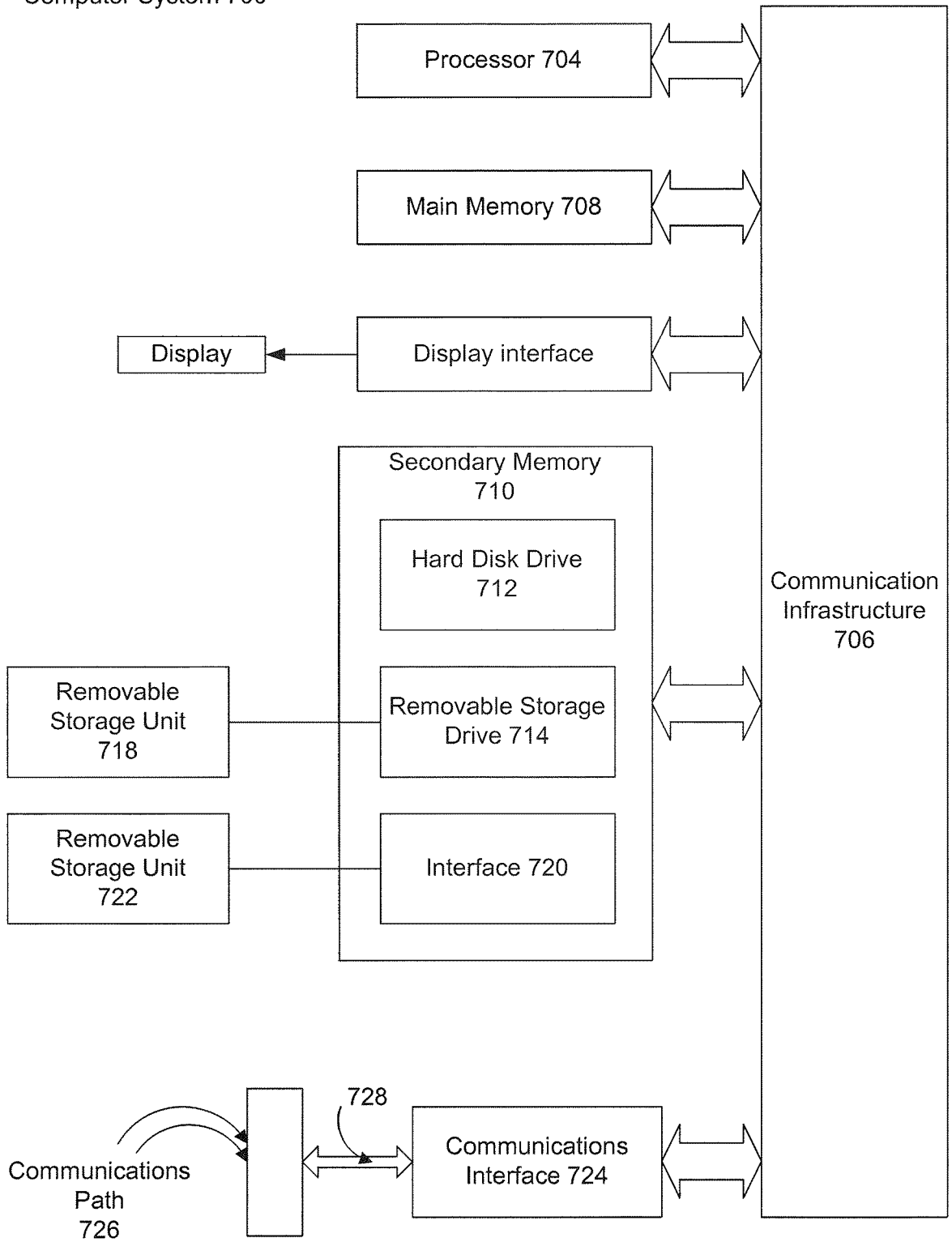
FIG. 7 is a block diagram of an exemplary computer system on which embodiments can be implemented.

FIG. 7 is a schematic diagram of an example computer system 700 used to implement embodiments for insertions in 3D video. Various aspects of the various embodiments can be implemented by software, firmware, hardware, or a combination thereof. FIG. 7 illustrates an example computer system 700 in which an embodiment, or portions thereof, can be implemented as computer-readable code. Various embodiments are described in tennis of this example computer system 700. After reading this description, it will become apparent to a person skilled in the relevant art how to implement embodiments using other computer systems and/or computer architectures.

Computer system 700 includes one or more processors, such as processor 704. Processor 704 can be a special purpose or a general purpose processor. Processor 704 is connected to a communication infrastructure 706 (for example, a bus or network).

Computer system 700 also includes a main memory 708, preferably random access memory (RAM), and may also include a secondary memory 710. Secondary memory 710 may include, for example, a hard disk drive 712 and/or a removable storage drive 714. Removable storage drive 714 may comprise a floppy disk drive, a magnetic tape drive, an optical disk drive, a flash memory, or the like. The removable storage drive 714 reads from and/or writes to a removable storage unit 718 in a well known manner. Removable storage unit 718 may comprise a floppy disk, magnetic tape, optical disk, etc. which is read by and written to by removable storage drive 714. As will be appreciated by persons skilled in the relevant art(s), removable storage unit 718 includes a tangible computer readable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (e.g., an Ethernet card), a communications port, a PCMCIA slot and card, or the like. Software and data transferred via communications interface 724 are provided to communications interface 724 via a communications path 726. Communications path 726 may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Computer program medium and computer usable medium can also refer to memories, such as main memory 708 and secondary memory 710, which can be memory semiconductors (e.g. DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement embodiments as discussed herein, such as the system described above. In particular, the computer programs, when executed, enable processor 704 to implement the processes of embodiments. Accordingly, such computer programs represent controllers of the computer system 700. Where embodiments are implemented using software, the software may be stored in a computer program product and loaded into computer system 700 using removable storage drive 714, interface 720, hard drive 712 or communications interface 724.

Described above are systems, apparatuses, and methods for insertions in 3D video, and applications thereof. It is to be appreciated that the Detailed Description section, and not the Abstract, is intended to be used to interpret the claims. The Abstract may set forth one or more but not all exemplary embodiments of the present invention as contemplated by the inventors, and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
   determining a first camera data parameter of a first camera model associated with a first channel of a 3D video, wherein the first camera model describes the field of view of the first channel;
   determining a second camera data parameter of a second camera model associated with a second channel of the 3D video, wherein the second camera model describes the field of view of the second channel,
      wherein determining the first camera data parameter and second camera data parameter is based on a search analysis of at least the first channel,
      wherein the search analysis is based on voxels corresponding to at least the first channel and,
      wherein the search analysis is constrained within a region of at least the first channel that is less than the field of view of at least the first channel and the region is based on a relationship between the first channel and the second channel of 3D video;
   generating a composite camera model by reconciling the first camera data parameter of the first camera model and the second camera data parameter of the second camera model; and
   inserting an enhancement into the 3D video based on the composite camera model.

2. The method of claim 1, further comprising reconciling the first camera model and the second camera model.

3. The method of claim 1, further comprising automatically calibrating a 3D camera system associated with the 3D video, based on the first camera data parameter and the second camera data parameter.

4. The method of claim 1, wherein at least one of the first camera data parameter and the second camera data parameter is obtained from a 3D camera system associated with the 3D video.

5. The method of claim 1, further comprising updating the first camera data parameter and the second camera data parameter based on at least tracking analysis of the first channel.

6. The method of claim 5, wherein the tracking analysis is based on voxels.

7. The method of claim 1, further comprising occluding the enhancement based on the composite camera model.

8. The method of claim 7, further comprising occluding the enhancement based on a target object distance determined from parallax information associated with first channel and the second channel of the 3D video.

9. The method of claim 1, further comprising interactively positioning the enhancement at a 3D location according to received input.

10. The method of claim 9, wherein the enhancement is a telestration graphic.

11. The method of claim 1, wherein the enhancement is a rendered three-dimensional visual element.

12. The method of claim 1, further comprising automatically positioning the enhancement at a 3D location according to a scene composition of the 3D video and a type of the enhancement.

13. The method of claim 12, wherein the enhancement is at least one of an integrated graphic, a score box graphic, a telestration graphic, a subtitle, closed captioning, a pop-up graphic, an overlay graphic, and a burn-in graphic.

14. The method of claim 1, further comprising updating the enhancement to track, in 3D space, a point of interest associated with the 3D video, based on at least camera data including ocular spacing or toe angle.

15. The method of claim 1, wherein the inserting is performed remotely from an on-site production pipe-line stage.

16. The method of claim 15, further comprising receiving the camera data parameters at pipe-line stages remote from the on-site production pipe-line stage.

17. The method of claim 15, further comprising embedding the camera data parameters into the 3D video at the on-site production pipe-line stage.

18. The method of claim 15, further comprising inserting a target place holder for the enhancement into the 3D video, wherein the inserting the enhancement is based on the target place holder.

19. The method of claim 18, wherein the target place holder is generated at the on-site production pipe-line stage.

20. The method of claim 18, wherein the target place holder is generated at a centralized location downstream from the on-site production pipe-line stage.

21. A system comprising:
   a first search module for determining a first camera model associated with a first channel of a 3D video, wherein the first camera model describes the field of view of the first channel;
   a second search module for determining a second camera model associated with a second channel of the 3D video, wherein the second camera model describes the field of view of the second channel,
      wherein determining the first camera model and the second camera model is based on a search analysis of at least the first channel,
      wherein the search analysis is based on voxels corresponding to at least the first channel and,
      wherein the search analysis is constrained within a region of at least the first channel that is less than the field of view of at least the first channel and the region is based on a relationship between the first channel and the second channel of 3D video;
   a controller module for generating a composite camera model by reconciling the first camera model and the second camera model, and
   a mixer module for inserting an enhancement into the 3D video based on the composite camera model.

22. A method comprising:
   receiving a first camera data parameter associated with at least one of a first camera model and a second camera model, wherein the first camera model is associated with a first channel of a 3D video and describes the field of view of the first channel and wherein the second camera model is associated with a second channel of the 3D video and describes the field of view of the second channel;
   receiving a second camera data parameter associated with the at least one of the first camera model and the second camera model;
      wherein determining the first camera data parameter and the second camera data parameter is based on a search analysis of at least the first channel,
      wherein the search analysis is based on voxels corresponding to at least the first channel, and wherein the search analysis is constrained within a region of at least the first channel and the region is based on a relationship between the first channel and the second channel of 3D video;

generating a composite camera model based on at least the first camera data parameter and the second camera data parameter, and inserting an enhancement into the 3D video based on the composite camera model, wherein the inserting is performed remotely from an on-site production pipe-line stage.

23. The method of claim 22, wherein the first camera data parameter and the second camera data parameter are transmitted from the on-site production pipe-line stage.

24. The method of claim 1, wherein the composite camera model is constructed from at least three of the following parameters: pan, tilt, roll, image distance, radial lens distortion, zoom distance, and x, y, and z positions.

25. The method of claim 1, wherein the composite camera model includes a camera position in 3D world coordinates, wherein the camera position is midway between the first camera model and second camera model.

26. The method of claim 1, wherein a first reconciliation is used for a subset of the first camera data parameter and the second camera data parameter before the reconciliation used to generate the composite camera model.

27. The method of claim 1, wherein the reconciliation limits physical parameters to valid expected ranges.

* * * * *